July 14, 1964     W. S. MILLER     3,140,619
LINEAR MOTION POWER AMPLIFIER
Filed April 17, 1961                                  2 Sheets-Sheet 1
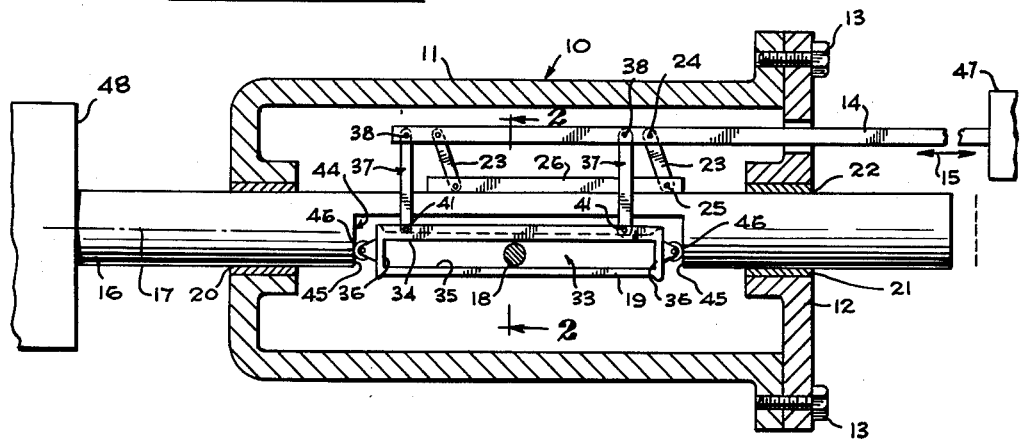
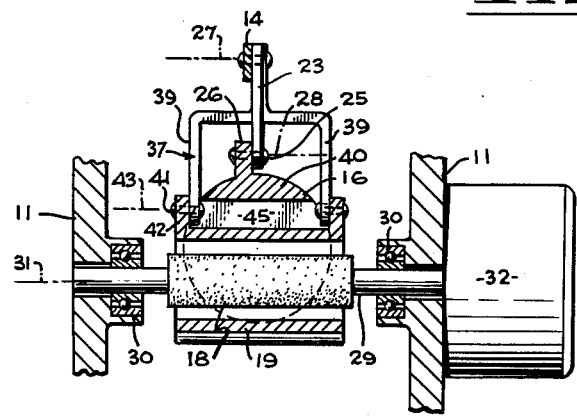
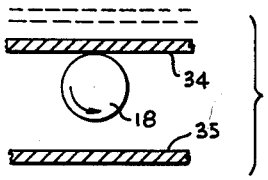
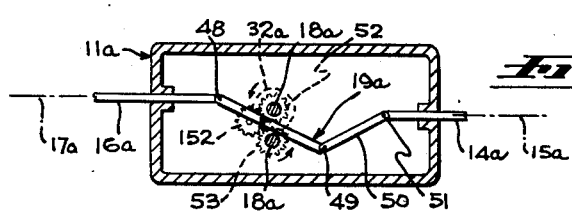
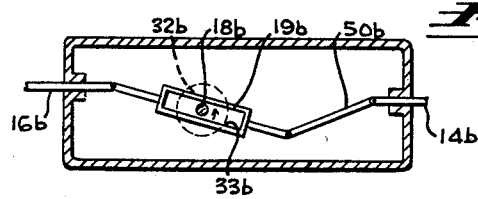
INVENTOR.
WENDELL S. MILLER
BY
William P. Green
ATTORNEY

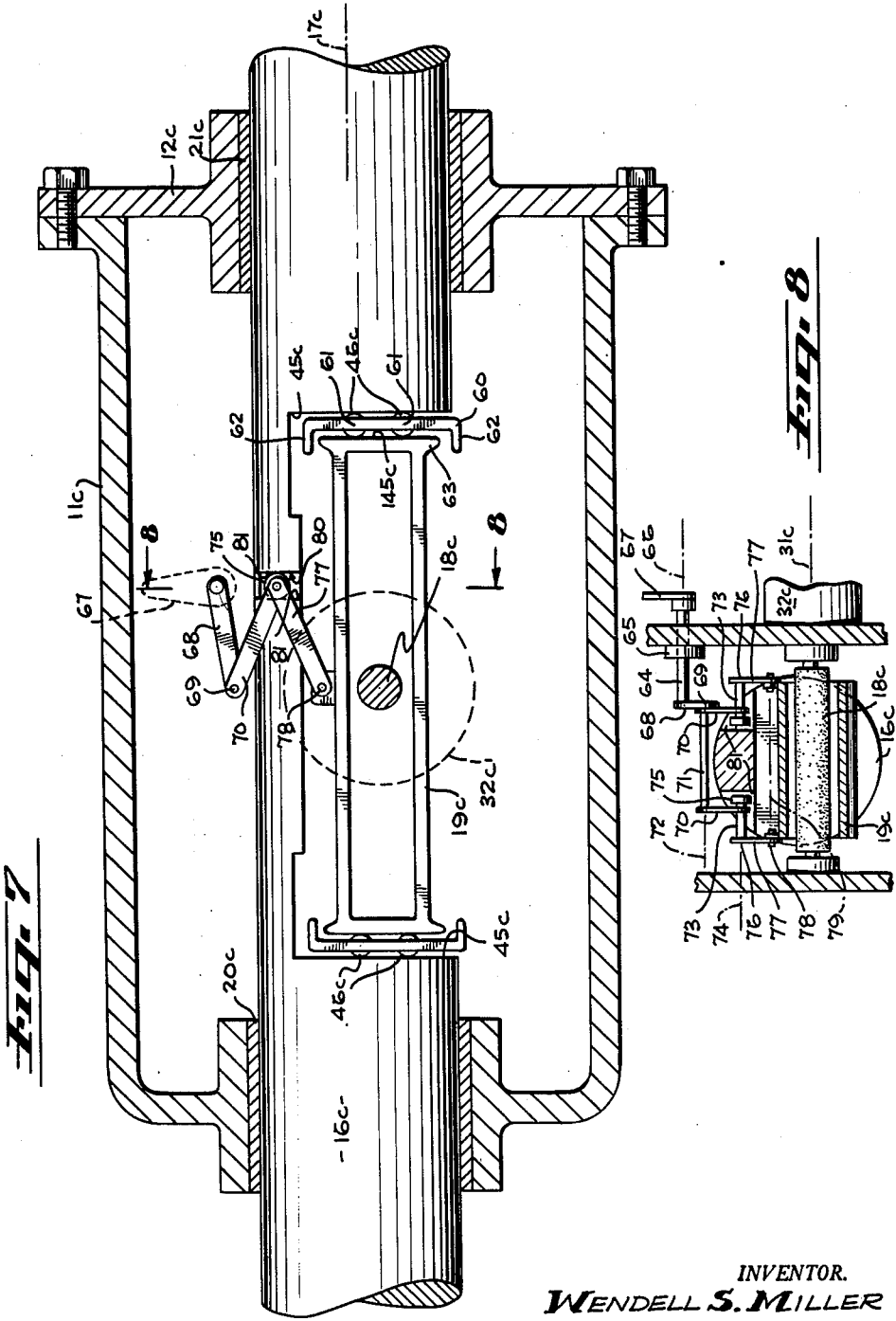

United States Patent Office 3,140,619
Patented July 14, 1964

1

3,140,619
LINEAR MOTION POWER AMPLIFIER
Wendell S. Miller, 1341 Comstock Ave.,
Los Angeles 24, Calif.
Filed Apr. 17, 1961, Ser. No. 103,384
17 Claims. (Cl. 74—30)

This invention relates to an improved type of mechanical power amplifier, for actuating an output element, with amplified power, in correspondence with the movements of an input or control element.

The apparatus of the present invention has been especially designed for use in solving power amplification problems in instances in which it is desired that the amplified motion at the output side of the device be essentially a linear (straight line) type of movement. The motion of the input element may be either linear or rotary, depending upon the use to which the device is to be put.

A primary object of the invention is to provide an arrangement for the above defined purpose, in which the movement of the output element is essentially linear, but in which the power supplied to the output element may come from a simple rotary type motor. In conjunction with this rotary power source, there is provided a unique motion converting arrangement, for changing the rotary motion to essentially linear movement, and including releasable power transmitting means operable to automatically shift the power source into and out of driving relation with respect to the output element, as necessary to cause the output element to follow movements of the input element.

The actuation of the mentioned releasable power transmitting means between different driving and released conditions is controlled automatically in response to differential movement of the input and output element. That is, if the input element moves in a particular direction, such movement will immediately actuate the releasable power transmitting means to a condition for initiating corresponding linear movement of the output element. As a result, the output element follows substantially exactly the movements of the input element, but with increased power supplied by the rotary motor or power source.

Structurally, the releasable power transmitting means may include a power driven wheel or wheels having surfaces frictionally engageable with and operable to drive coacting linearly movable surfaces on another part. These rotary and linearly movable elements are mounted for relative shifting movement, desirably transversely of the axis or axes of the rotary element or elements, in response to the aforementioned differential movement of the input and output elements. In one form of the invention, the linearly movable unit takes the form of a yoke disposed about the rotating element, and adapted to engage and be driven by either of two opposite sides of the rotary element in accordance with shifting movement of the yoke relative to the rotary drive element. In another form of the invention, the linearly movable part is an elongated member received between two spaced rotary drive wheels, and engageable selectively with either of the two wheels, to drive the elongated member in opposite directions.

The above and other features and objects of the present invention will be better understood from the following detailed description of the typical embodiments illustrated in the accompanying drawings, in which:

FIG. 1 is a view representing a first form of power amplifier constructed in accordance with the invention, and with the housing of the device shown in cross-section to reveal the inner working parts of the unit;

FIG. 2 is an enlarged fragmentary transverse section taken on line 2—2 of FIG. 1;

FIGS. 3 and 4 show diagrammatically the releasable power transmitting means of the FIG. 1 device in its two opposite drive conditions respectively;

FIGS. 5, 6 and 7 are views similar to FIG. 1 but representing three additional forms of the invention; and FIG. 8 is a fragmentary transverse section taken on line 8—8 of FIG. 7.

Referring first to FIGS. 1 and 2, the power amplifier 10 shown in those figures includes an outer housing typically consisting of a main hollow section 11 closed at one end by a cover 12 secured to the main section by bolts 13. The input element by which the unit is controlled is an elongated rigid rod 14, mounted for longitudinal linear movement in either a leftward or rightward direction, as indicated by the arrow 15. The movements of element 14 in the direction 15 are followed by output element 16, which moves in either of two opposite directions along an axis 17 extending parallel to the direction 15. Power is supplied to output element 16 by means of a rotary element 18, coacting with and driving a yoke 19 whose linear movement is transmitted to output part 16.

The output element 16 may take the form of a relatively large diameter ruggedly built cylindrical shaft, as shown, in order to be capable of handling the heavy forces applied to element 16 in use. Shaft 16 may be mounted for its axial movement by sleeve bushings 20 and 21 carried by the housing, with one of these bushings (bushing 21 in FIG. 1) typically having a splined connection at 22 with the shaft acting to prevent rotation of the shaft while permitting the desired axial movement. Bushings 20 and 21 are of course retained in fixed positions in the housing, as by pressed fit engagement with the carrying portions of the housing.

Input element 14 is movably mounted to output element 16 by means of a pair of identical links 23, each having an upper end pivotally connected at 24, by a suitable pivot pin or the like, to input element 14. The lower ends of links 23 are pivotally connected at 25 to an upstanding flange 26 formed on output element 16. The four pivotal connections at 24 and 25 have axes which are parallel to one another, as represented at 27 and 28 in FIG. 2, and which axes extend transversely of the direction 15 in which input element 14 moves essentially linearly, and the axis 17 along which output element 16 moves. The upstanding flange 26 on output element 16 extends parallel to input element 14, and the two links 23 of course extend parallel to one another, so that the parts 14, 23, and 26 form together a parallelogram linkage, which allows input element 14 to move longitudinally relative to output element 16, but which requires slight vertical movement of input element 14 in correspondence with any such relative longitudinal movement.

The rotary element 18 may be a somewhat elongated externally cylindrical wheel (see FIG. 2), having an outer surface formed of a high friction material such as that commonly used in brakeband linings, high friction clutch elements, and the like. Part 18 is rigidly carried by a shaft 29, which is journalled at its opposite ends within housing mounted bearings 30 for rotation about an axis 31 extending parallel to axes 27 and 28, and extending transversely of the directions of movements 15 and 17 of the input and output elements. Shaft 29 and its carried rotary element 18 are desirably driven continuously, rotatively about axis 31, by a motor 32, which may be mounted to the outside of housing section 11. In the arrangement illustrated in FIGS. 1 and 2, the direction of rotation of part 18 may be in a counterclockwise direction, as viewed in FIG. 1, and as brought out more clearly in FIGS. 3 and 4.

The clutching yoke 19 which coacts with the rotary power element 18 is a rigid part, typically formed of metal, and containing an elongated slot 33 within which part 18 is received. Slot 33 is defined at its upper and lower sides (as viewed in FIGS. 1 and 2) by two parallel planar drive surfaces 34 and 35, and two parallel vertical end surfaces 36. Surfaces 34 and 35 lie in planes which are parallel to axis 17, the direction of movement 15 of input element 14, and to all of the axes 24, 25 and 31. Surfaces 34 and 35 are spaced apart a distance somewhat greater than the diameter of rotary drive element 18, so that in the FIG. 1 neutral position of yoke 19, neither surface 34 nor surface 35 engages element 18 or is driven thereby. Yoke 19 is shiftable vertically far enough to bring either surface 34 or 35 into engagement with part 18, to drive the yoke in opposite linear directions (see FIGS. 3 and 4). In each of the FIG. 3 and FIG. 4 positions, the engagement between part 18 and surface 34 or 35 is essentially a line contact, with the line of contact extending parallel to axes 24, 25 and 31.

Yoke 19 is suspended from input element 14 by means of two identical parallel suspending links 37. These links are pivoted to input element 14 at their upper ends 38, and may each have a bifurcated lower portion forming two parallel vertical arms 39 extending downwardly past a portion 40 of shaft 16 and pivotally connected at 41 to flanges 42 of yoke 19. The pivotal axes 43 at the pivot points 41, and the pivotal axes at the upper ends 38 of links 37, desirably extend parallel to the previously mentioned axes 24, 25 and 31, and therefore extend transversely of the direction of linear movement of parts 14 and 16.

At the location of yoke 19 and rotary drive element 18, shaft 16 has a recess 44, whose opposite ends are defined by two parallel walls 45, extending transversely of axis 17, and against which two rollers 46 carried by yoke 19 are movably engageable. Rollers 46 are mounted to yoke 19 for rotation about axes extending parallel to axis 31. The yoke and its carried rollers have a combined axial extent corresponding to the spacing between the two transverse walls 45 of output element 16, so that movement of yoke 19 in either direction along axis 17 will be transmitted without loss to output element 16, and yet at the same time, yoke 19 is free for limited vertical movement (as viewed in FIG. 1), relative to output element 16, with rollers 16 moving upwardly or downwardly along surfaces 45.

To now describe the manner of operation of the device shown in FIGS. 1 through 4, assume initially that yoke 19 and the other parts of the apparatus are in the neutral positions shown in FIGS. 1 and 2. Also, assume that electric motor 32 is in operation, and is continuously driving rotary element 18 in a counterclockwise direction as viewed in FIGS. 1, 3 and 4. Linear input movements may be applied to input element 14 either manually, or by means of some type of control mechanism typically represented in FIG. 1 at 47. Corresponding output movement of shaft 16 may be transmitted to, and utilized to linearly drive, an actuated mechanism digrammatically represented at 48.

If, with yoke 19 initially in its neutral position of FIG. 1, control unit 47 is actuated to move input element 14 to the left, such leftward movement of element 14 relative to output element 16 acts through links 23 to cause a slight downward swinging movement of element 14 and links 23 about the pivotal axes of connections 25 at the lower ends of links 23. This slight downward movement of element 14 is transmitted through links 37 to yoke 19, to move the yoke downwardly until surface 34 of the yoke engages the top of continuously turning rotary drive member 18. This upper surface of member 18 is moving to the left, and therefore acts to move the engaged planar surface 34 to the left, and thereby shift yoke 19 and output element 16 in correspondence with the leftward movement of input element 14. The powered linear actuation of output element 16 continues until the pivot points at 25 have moved far enough to return links 23 to the FIG. 1 normal inclination, and thereby elevate the yoke to its neutral FIG. 1 position, in which engagement between element 18 and surface 34 in broken, and the output element 16 therefore stops.

If the input element is moved in the opposite direction, to the right in FIG. 1, then the swinging movement of links 23 about axes 25 raises yoke 19 slightly, to bring surface 35 of the yoke into engagement with the rightwardly moving undersurface of element 18, and thereby shift output element 16 to the right in correspondence with the linear movement of element 14. In this instance also, the motion continues until links 23 return to their normal positions, in which the elements 18 and 19 are in neutral non-power-transmitting relation. Thus, the power driven element 18 acts to cause output element 16 to always move linearly in a manner exactly following the movements of input element 14.

Referring now to FIG. 5, the variational arrangement thereshown diagrammatically includes a housing 11a, having an input element 14a and an output element 16a mounted for only longitudinal movement along the two parallel axes 15a and 17a. Instead of the yoke 19 of FIG. 1, the FIG. 5 device utilizes an elongated rigid rod or bar 19a, which is pivoted at one end 48 to output element 16a, and which is pivoted at its opposite end 49 to a link 50 whose second end is pivoted at 51 to input element 14a. All of the pivotal axes at 48, 49 and 51 are parallel to one another.

Instead of the single rotary drive element 18 of FIG. 1, the FIG. 5 device uses two spaced rotary elements 18a, which may be constructed the same as element 18 of FIG. 1, and which are mounted to turn about two parallel axes at the upper and lower sides of the inclined co-acting element 19a. The axes of parts 18a desirably extend parallel to the pivotal axes at 48, 49 and 51. Elements 18a are suitably journalled for rotation about their axes, and are driven in the same direction by a typically continuously operating electric motor 32a, whose output shaft may be connected to the upper element 18a to drive it in a counterclockwise direction, with the lower element 18a being driven in the same rotary direction through a gear 52 attached to element 18a, an idler gear 152, and a third gear 53 connected to the lower element 18a.

In the neutral condition of the FIG. 5 device, inclined bar 19a engages neither of the power driven rotary elements 18a, and therefore there is no linear movement applied to output element 16a. If input element 14a is then actuated linearly in a leftward direction, such movement of the input element moves the pivot pin at 51 to the left relative to pivotal connection 48, and therefore causes the third pivotal connection 49 to swing downwardly. Such downward movement of pivotal connection 49 swings element 19a into engagement with the upper surface of the bottom element 18a, which is turning in a counterclockwise direction and therefore acts to shift element 19a to the left. This leftward movement is transmitted to output element 16a, and continues until part 19a returns to a neutral position of reception between the two drive elements 18a, and out of engagement with both of those elements. Upon rightward movement of input element 14a, member 19a is swung upwardly into engagement with the rightwardly moving undersurface of the top element 18a, to shift part 19a and output element to the right in correspondence with the movement of input element 14a. Thus, the two elements 18a driven by motor 32a act to always move output element 16a linearly in correspondence with the input element 14a, but with increased power.

FIG. 6 shows another form of the invention which is the same as that of FIG. 5, except that a yoke 19b is substituted for part 19a, and engages a single rotary element 18b received in slot 33b of the yoke. Element 18b may be driven by an electric motor represented at 32b. The input element 14b and output element 16b and link 50b may all be the same as the corresponding parts of FIG. 5, and be interconnected by pivotal connections having axes parallel to that of element 18b. In FIG. 6, element 18b should turn in a counterclockwise direction.

To describe the operation of the FIG. 6 device, assume first that input element 14b is moved to the left, with resultant downward swinging of yoke 19b. As in the case of the FIG. 1 yoke, this causes element 18b to engage the upper side of slot 33b, and drive the yoke and element 16b to the left. Similarly, rightward movement of element 14b shifts the yoke 19b upwardly, to bring part 18b into engagement with the bottom wall of slot 33b, and shift the yoke and connected part 16b to the right. In the normal or neutral position of yoke 19b, element 18b does not engage the yoke at either the upper side or under side of element 18b, and consequently does not drive the output part in either direction. Thus, as in the other forms of the invention, the apparatus of FIG. 6 acts to automatically cause output element 16b to follow the linear movements of input element 14b.

FIGS. 7 and 8 show another form of the invention, whose functioning is very similar to that of the device shown in FIG. 1, except that the input signal supplied to the device is in the form of a rotary type of movement, rather than a linear movement. The apparatus of FIGS. 7 and 8 is contained within a housing 11c–12c, carrying bushings 20c and 21c mounting output shaft 16c for only linear movement along axis 17c. Yoke 19c is similar to yoke 19 of FIG. 1, and is adapted to be driven in opposite directions along axis 17c by rotary element 18c which is continuously driven by electric motor 32c about an axis 31c disposed transversely of axis 17c. Movements of yoke 19c in the direction of axis 17c are transmitted to output shaft 16c through two pairs of rollers 46c, engaging and adapted to roll along opposed parallel surfaces 45c and 145c on parts 16c and 19c. As will be apparent, surfaces 45c and 145c are disposed transversely of axis 17c and parallel to axis 31c. The two rollers 46c of each pair of rollers may be held in proper positions relative to the other portions of the apparatus by means of a retainer part 60, extending alongside rollers 36c and rotatably carrying the rollers by means of pivot pins 61. Each of the two retainer parts 60 may have lugs or flanges 62 at its upper or lower ends, extending into overlapping relation with yoke 19c, and engageable with projections 63 of the yoke to limit upward and downward movement of parts 46c and 60 relative to the yoke.

The input signal to the device of FIGS. 7 and 8 is supplied through an input shaft 64, which is journalled in a bearing 65 for rotary movement about an axis 66 extending parallel to axis 31c of element 18c. A handle or lever 67 may be connected to shaft 64 at the outside of housing 11c–12c, for actuating shaft 64 either manually or by power operated means. The inner end of shaft 64 is rigidly attached to and actuates an arm 68, to swing arm 68 about axis 66 with the shaft. The second end of arm 68 is pivoted at 69 to one or a pair of links 70. In FIG. 8, there are typically represented two such links 70, rigidly interconnected by a shaft or cross member 71, with an end of shaft 71 projecting beyond one of the links 70 to form the pivot pin for pivotally connecting part 68 at 69 to the three piece rigid structure formed by the two parts 70 and cross piece 71. The axis of this pivotal connection is represented at 72 in FIG. 8, and extends parallel to axis 66.

At their lower ends, the two parallel spaced arms 70 may carry two aligned shafts extending along an axis 74, and mounting a pair of rollers 75 for rotary movement about axis 74 relative to parts 70. The outer ends of shafts 73 are pivoted at 76 to a pair of parallel identical links 77 for relative pivotal movement about axis 74. The lower ends of links 77 are in turn pivoted at 78 to yoke 19c for relative swinging movement about an axis 79, which is parallel to axes 74, 72, 66 and 31c.

Rollers 75 are received and confined within two parallel vertical grooves or guideways 80 formed in opposite sides of output shaft 16c, each of which grooves is defined at its opposite sides by two parallel planar surfaces 81 extending parallel to yoke guiding surfaces 45c and 145c, and extending transversely of the main axis 17c of the output shaft. Thus, rollers 75 are confined for movement relative to output shaft 16c in the same direction in which yoke 19c may move relative to output shaft 16c. In order to attain the manner of operation to be discussed below, links 70 extend angularly downwardly and to the right, as viewed in FIG. 7, and links 77 extend angularly downwardly and to the left as viewed in that figure.

In discussing the operation of the device shown in FIGS. 7 and 8, assume that motor 32c is operating continuously in a direction to drive friction element 18c rotatively in a clockwise direction as viewed in FIG. 7. If input shaft 64 is then turned in a counterclockwise direction as viewed in FIG. 7, such movement swings the crank arm 68 downwardly, to correspondingly swing cross piece 71 downwardly. Element 71 carries with it the connected parts 70, whose carried rollers 75 are restrained by guideways 80 against lateral movement, and therefore move downwardly. Such downward movement of rollers 75 causes corresponding downward movement of the upper ends of links 77, which in turn move yoke 19c downwardly to engage the upper surface of element 18c and be moved to the right thereby. As element 19c moves to the right, it shifts correspondingly the output shaft 16c, linearly along axis 17c, until this movement of the output shaft acts through grooves 80 to shift rollers 75 far enough to the right to cause links 77 to return yoke 19c upwardly to a neutral position, out of engagement with element 18c. Thus, shaft 16c has been power actuated linearly in correspondence with the rotary power actuation of input shaft 64c. Similarly, if input shaft 64 is turned in a clockwise direction as viewed in FIG. 7, crank arm 68 swings upwardly, to pull elements 71, 70, 75, 73 and 77 upwardly, and thereby shift yoke 19c upwardly into engagement with the undersurface of element 18c, to drive the yoke and output element to the left along axis 17c until this shifting movement is sufficient to again move the yoke out of engagement with element 18c. In this way, the output shaft is always actuated linearly to exactly follow the rotary movements of input shaft 64.

I claim:

1. A power amplifier comprising an input element mounted for generally linear movement between a large number of successive positions, an output element mounted for generally linear movement in essentially the same direction as said input element and between a large number of successive positions corresponding respectively to said positions of the input element, a connection attaching said input element to said output element for swinging movement relative thereto in a direction to advance linearly relative to the ouput element and to simultaneously shift transversely of said direction of linear movement, power driven rotary drive means, releasable power transmitting means connected to said output element to drive it linearly but shiftable laterally relative thereto between different positions, said power transmitting means and said rotary drive means having faces engageable in said different positions of the power transmitting means to drive the power transmitting means in opposite linear directions and thereby drive the output element in opposite linear directions, and automatic follow-up means for shifting said power transmitting means between said different positions in response to said swinging movement of the input element relative to the output element and in a relation causing said rotary drive means to power actuate the output element linearly to said different position thereof in essential correspondence with the linear movement of said input element to said different corresponding positions thereof.

2. A power amplifier as recited in claim 1, in which said connection between the input and output elements includes two spaced parallel links pivoted to both of said elements in a relation forming a parallelogram connection.

3. A power amplifier as recited in claim 1, in which said rotary drive means include a power driven wheel turning about an axis, said releasable power transmitting means including a member mounted for generally linear movement adjacent the wheel and shiftable into and out of engagement with the wheel.

4. A power amplifier as recited in claim 1, in which said rotary drive means include a power driven wheel turning about an axis, said releasable power transmitting means including a yoke having portions extending along opposite sides of said wheel and shiftable laterally into and out of driven engagement with said opposite sides of the wheel.

5. A power amplifier as recited in claim 1, in which said rotary drive means include a power driven wheel turning about an axis, said releasable power transmitting means including a yoke having portions extending along opposite sides of said wheel and shiftable laterally into and out of driven engagement with said opposite sides of the wheel, said output element having two spaced shoulders facing toward one another at opposite ends of said yoke, and said yoke having rotatable bearings at said opposite ends bearing against said two shoulders respectively to transmit linear movement of the yoke thereto.

6. A power amplifier as recited in claim 5, in which said automatic follow-up means include two spaced connecting links attaching said yoke to the input element for shifting movement therewith.

7. A power amplifier comprising an input element and an output element mounted for generally linear movement in generally the same direction, power operated rotary drive means, a releasable power transmitting unit adjacent said rotary drive means and shiftable into and out of driven engagement therewith in a relation to be driven generally linearly thereby, means connecting said releasable power transmitting unit essentially pivotally to one of said elements at a first location, an actuating link connected essentially pivotally to the other of said elements at a second location, a connection attaching said releasable power transmitting unit and said link together essentially pivotally at a third location in a relation to swing said power transmitting unit relative to said one element into and out of driven engagement with said drive means automatically in response to differential linear movement of said input and output elements in generally said direction and to thereby cause linear actuation of said output element in said direction by the drive means in correspondence with and substantially following generally linear movements of the input element in generally said direction.

8. A power amplifier as recited in claim 7, in which said rotary drive means include a power driven wheel turning about an axis, said releasable power transmitting unit being a yoke having portions received at opposite sides of said wheel and shiftable into and out of generally linearly driven engagement with opposite sides of said wheel.

9. A power amplifier as recited in claim 7, in which said rotary drive means include two power driven wheels turning in a common direction about spaced axes, said releasable power transmitting unit including an elongated member extending between said two wheels and shiftable laterally into and out of generally linearly driven engagement with said two wheels respectively.

10. A power amplifier comprising a position control input element mounted for predetermined movement in essentially opposite directions between a large number of successive positions, an output element mounted for generally linear movement between a large number of successive positions corresponding respectively to said positions of the input element, rotary power input means for driving said output element, releasable power transmitting means for transmitting power from said rotary power input means to said output element, said releasable power transmitting means being actuable between a first condition in which said rotary power input means drive said output element essentially linearly in one direction, and a second condition in which said rotary power input means drive said output element essentially linearly in essentially the opposite direction, and automatic follow-up control mechanism operable in response to movement of said position control input element in either of its two directions from any of said large number of positions thereof toward any other position to shift said releasable power transmitting means to a proper one of said two conditions for driving said output element linearly in a corresponding one of its two directions, and operable in response to stopping of said position control input element at any of said large number of positions thereof to automatically halt said output element at a corresponding one of its numerous positions, said rotary power input means including a power driven wheel turning about an axis, said releasable power transmitting means including a member mounted for generally linear movement adjacent said wheel and shiftable laterally by said automatic follow-up control mechanism into and out of driven engagement with said wheel.

11. A power amplifier comprising a position control input element mounted for predetermined movement in essentially opposite directions between a large number of successive positions, an output element mounted for generally linear movement between a large number of successive positions corresponding respectively to said positions of the input element, rotary power input means for driving said output element, releasable power transmitting means for transmitting power from said rotary power input means to said output element, said releasable power transmitting means being actuable between a first condition in which said rotary power input means drive said output element essentially linearly in one direction, and a second condition in which said rotary power input means drive said output element essentially linearly in essentially the opposite direction, and automatic follow-up control mechanism operable in response to movement of said position control input element in either of its two directions from any of said large number of positions thereof toward any other position to shift said releasable power transmitting means to a proper one of said two conditions for driving said output element linearly in a corresponding one of its two directions, and operable in response to stopping of said position control input element at any of said large number of positions thereof to automatically halt said output element at a corresponding one of its numerous positions, said rotary power input means including a power driven wheel turning about an axis, said releasable power transmitting means including a yoke having portions extending along opposite sides of said wheel and shiftable laterally by said automatic follow-up control mechanism into and out of engagement with said opposite sides of the wheel.

12. A power amplifier comprising a position control input element mounted for predetermined movement in essentially opposite directions between a large number of successive positions, an output element mounted for generally linear movement between a large number of successive positions corresponding respectively to said positions of the input element, rotary power input means for driving said output element, releasable power transmitting means for transmitting power from said rotary power input means to said output element, said releasable power transmitting means being actuable between a first condition in which said rotary power input means drive said output element essentially linearly in one direction, and a second condition in which said rotary power input means drive said output element essentially linearly in essentially the opposite direction, and automatic follow-up control mechanism operable in response to movement of said position control input element in either of its two directions from any of said large number of positions thereof toward any other position to shift said releasable power transmitting means to a proper one of said two conditions for driving said output element linearly in a corresponding one of its two directions, and operable in response to stopping of said position control input element at any of said large number of positions thereof to automatically halt said output element at a corresponding one of its numerous positions, said rotary power input means including two power driven wheels turning about two spaced axes, said releasable power transmitting means including a member extending between said two wheels and mounted for generally linear movement in opposite directions by said two wheels respectively and shiftable laterally by said automatic follow-up control mechanism into and out of driven engagement with said two wheels selectively.

13. A power amplifier comprising a position control input element mounted for rotary movement in opposite directions between a large number of successive positions, an output element mounted for generally linear movement between a large number of successive positions corresponding respectively to said positions of the input element, rotary power input means for driving said output element, releasable power transmitting means for transmitting power from said rotary power input means to said output element, said releasable power transmitting means being actuable between a first condition in which said rotary power input means drive said output element essentially linearly in one direction, and a second condition in which said rotary power input means drive said output element essentially linearly in essentially the opposite direction, and automatic follow-up control mechanism operable in response to movement of said position control input element in either of its two directions from any of said large number of positions thereof toward any other position to shift said releasable power transmitting means to a proper one of said two conditions for driving said output element linearly in a corresponding one of its two directions, and operable in response to stopping of said position control input element in any of said large number of positions thereof to automatically halt said output element at a corresponding one of its numerous positions, said rotary power input means including a power driven wheel turning about an axis, said releasable power transmitting means including a member mounted for generally linear movement adjacent said wheel and shiftable laterally by said automatic follow-up control mechanism into and out of driven engagement with said wheel.

14. A power amplifier comprising a position control input element mounted for rotary movement in opposite directions between a large number of successive positions, an output element mounted for generally linear movement between a large number of successive positions corresponding respectively to said positions of the input element, rotary power input means for driving said output element, releasable power transmitting means for transmitting power from said rotary power input means to said output element, said releasable power transmitting means being actuable between a first condition in which said rotary power input means drive said output element essentially linearly in one direction, and a second condition in which said rotary power input means drive said output element essentially linearly in essentially the opposite direction, and automatic follow-up control mechanism operable in response to movement of said position control input element in either of its two directions from any of said large number of positions thereof toward any other position to shift said releasable power transmitting means to a proper one of said two conditions for driving said output element linearly in a corresponding one of its two directions, and operable in response to stopping of said position control input element at any of said large number of positions thereof to automatically halt said output element at a corresponding one of its numerous positions, said rotary power input means including a power driven wheel turning about an axis, said releasable power transmitting means including a member mounted for generally linear movement adjacent said wheel and shiftable laterally by said automatic follow-up control mechanism into and out of driven engagement with said wheel, said automatic control mechanism including two links pivoted together at a first location and pivoted respectively at locations offset from said first location to said position control input element and said member respectively, and a connection between said links and said output element confining said two links at said first location against linear movement relative to said output element in said one direction or said opposite direction.

15. A power amplifier as recited in claim 14, in which said connection includes a roller carried by said links at said location and confined in a groove in said output element for movement only transversely of said one direction and said opposite direction.

16. A power amplifier comprising a position control input element mounted for generally linear movement in essentially opposite directions between a large number of successive positions, an output element mounted for generally linear movement essentially parallel to said position control input element in said opposite directions between a large number of successive positions corresponding respectively to said positions of the input element, rotary power input means for driving said output element, releasable power transmitting means for transmitting power from said rotary power input means to said output element, said rotary power input means and said releasable power transmitting means being relatively movable between first positions in which said rotary power input means drive said output element essentially linearly in one direction, and second positions in which said rotary power input means drive said output element essentially linearly in essentially the opposite direction, and automatic follow-up control mechanism mechanically connecting said position control input element to one of said power input means and said power transmitting means and operable in response to movement of said position control input element in either of its two directions from any of said large number of positions thereof to relatively shift said rotary power input means and said releasable power transmitting means to a proper one of said two conditions for driving said output element linearly in a corresponding one of its two directions, and operable in response to stopping of said position control input element at any of said large number of positions thereof to automatically halt said output element at a corresponding one of its numerous positions.

17. A power amplifier as recited in claim 16, in which said rotary power input means include a power driven wheel turning about an axis, said releasable power transmitting means including a member mounted for generally linear movement adjacent said wheel, and interengageable power transmitting surfaces on said wheel and said member.

References Cited in the file of this patent

UNITED STATES PATENTS

| | | |
|---|---|---|
| 546,650 | Brown | Sept. 24, 1895 |
| 1,163,688 | Rice | Dec. 14, 1915 |
| 1,218,626 | Brown | Mar. 13, 1917 |
| 1,234,824 | Tatum | July 31, 1917 |
| 2,932,785 | Shovic | Apr. 12, 1960 |

FOREIGN PATENTS

| | | |
|---|---|---|
| 210,716 | Germany | June 10, 1909 |
| 29,195 | Great Britain | Dec. 15, 1910 |